United States Patent [19]

Dobo

[11] 4,222,977

[45] Sep. 16, 1980

[54] PROCESS TO PRODUCE INORGANIC HOLLOW FIBERS

[75] Inventor: Emerick J. Dobo, Cary, N.C.

[73] Assignee: Monsanto Company, St. Louis, Mo.

[21] Appl. No.: 906,503

[22] Filed: May 16, 1978

Related U.S. Application Data

[63] Continuation-in-part of Ser. No. 624,076, Oct. 20, 1975, Pat. No. 4,104,445.

[51] Int. Cl.$^2$ ............................................. C04B 35/64
[52] U.S. Cl. .................................. 264/63; 264/177 F; 264/182; 264/184; 264/209; 264/DIG. 19; 428/398; 428/567
[58] Field of Search ................... 264/63, 65, DIG. 19, 264/209, 177 F, 41, 82, 184; 428/376, 398, 35, 36, 586, 567

[56] References Cited

U.S. PATENT DOCUMENTS

| | | | |
|---|---|---|---|
| 2,571,457 | 10/1951 | Ladisch | 428/398 |
| 2,900,708 | 8/1959 | Pond | 29/194 |
| 2,942,931 | 6/1960 | Mitchell et al. | 264/188 |
| 2,993,018 | 7/1961 | Steinlin | 260/17.4 |
| 3,015,873 | 1/1962 | Dietzsch et al. | 428/9 |
| 3,111,396 | 11/1963 | Ball | 23/156 |
| 3,226,263 | 12/1965 | Oswan | 126/120 |
| 3,281,261 | 10/1966 | Lynch | 117/46 |
| 3,287,112 | 11/1966 | Blaha | 75/222 |
| 3,390,106 | 6/1968 | Green et al. | 75/222 |
| 3,400,189 | 9/1968 | Nacke | 264/9 |
| 3,406,025 | 10/1968 | Hamling | 75/0.5 |
| 3,433,632 | 3/1969 | Elbert et al. | 75/222 |
| 3,436,248 | 4/1969 | Dittvich et al. | 75/222 |
| 3,445,202 | 5/1969 | Grey | 428/398 |
| 3,445,361 | 5/1969 | Sicka et al. | 204/181 |
| 3,450,510 | 6/1969 | Calow | 29/182.2 |
| 3,503,844 | 3/1970 | Clement | 428/313 |
| 3,504,730 | 4/1970 | Dannohl | 164/50 |
| 3,529,044 | 9/1970 | Santeangelo | 264/29 |
| 3,540,884 | 11/1970 | Hovbury | 75/211 |
| 3,565,749 | 2/1971 | Wizon | 161/207 |
| 3,639,953 | 2/1972 | Kimava | 264/29 |
| 3,640,693 | 2/1972 | Galasso et al. | 65/2 |
| 3,671,228 | 6/1972 | McLative et al. | 75/707 |
| 3,697,262 | 10/1972 | Fenner | 75/214 |
| 3,713,865 | 1/1973 | Leeds | 106/43 |
| 3,725,186 | 4/1973 | Lynch | 156/89 |
| 3,748,119 | 7/1973 | Hwang et al. | 75/0.5 AA |
| 3,791,798 | 2/1974 | Joyce et al. | 29/182.2 |
| 3,846,527 | 11/1974 | Winter et al. | 264/63 |
| 3,897,221 | 7/1975 | Salyer et al. | 264/44 |
| 3,907,954 | 9/1975 | Mansmann et al. | 264/63 |
| 3,950,478 | 4/1976 | Kenworthy et al. | 264/234 |
| 4,010,233 | 3/1977 | Winter et al. | 264/63 |
| 4,023,489 | 5/1977 | Dobo | 106/165 |
| 4,084,036 | 4/1978 | Leonard | 428/398 |
| 4,089,921 | 5/1978 | Dobo | 264/63 |
| 4,104,445 | 8/1978 | Dobo | 428/567 |
| 4,105,548 | 8/1978 | Baker et al. | 210/23 H |
| 4,118,225 | 10/1978 | Dobo | 75/207 |
| 4,175,154 | 11/1979 | Dobo | 428/313 |

FOREIGN PATENT DOCUMENTS

| | | | |
|---|---|---|---|
| 44-24690 | 10/1969 | Japan | 264/211 |
| 45-28692 | 9/1970 | Japan . | |
| 51-99122 | 9/1976 | Japan . | |
| 343632 | 2/1931 | United Kingdom | 428/398 |

Primary Examiner—Jay H. Woo
Attorney, Agent, or Firm—Howard C. Stanley

[57] ABSTRACT

Process for the production of small tubing, e.g., hollow fibers comprising
  (a) preparing a solution of an organic fiber-forming polymer, containing, in a uniformly dispersed form, a sinterable inorganic material;
  (b) extruding the inorganic material-containing polymer solution through a hollow fiber spinneret;
  (c) forming a polymeric precursor hollow fiber, laden with the inorganic material;
  (d) treating the polymeric precursor hollow fiber to remove the organic polymer; and
  (e) sintering the resulting inorganic material in hollow fiber form.

13 Claims, No Drawings

PROCESS TO PRODUCE INORGANIC HOLLOW FIBERS

This application is a continuation-in-part of copending application Ser. No. 624,076, filed Oct. 20, 1975, now U.S. Pat. No. 4,104,445 which is incorporated herein by reference.

This invention relates to a process to produce small tubing, e.g., hollow fibers. Metal tube drawing procedures to make small tubing are expensive. Such procedures to make extremely small tubing, i.e., with fiber size outer diameters, are particularly expensive and may not be technically viable. This invention provides a process that readily and economically produces metal tubing of extremely small size. The process has also been found to be useful to produce small tubing of other inorganic materials.

The value of the process of this invention varies, generally, in inverse proportion with the outer diameter of the small tubing. That is, the smaller the tubing desired the move valuable the process. For very small outer diameter tubing, the costs of the process of the present invention do not apparently increase per unit length which contrasts with the costs of tube drawing procedures which generally accelerate when producing such small outer diameters.

In the description of the present invention, the following definitions are used.

The term "hollow fiber" as used in this application means a fiber (or monofilament) which has a length which is very large as compared to its diameter and has an axially disposed continuous channel which is devoid of the material that forms the fiber (more commonly referred to as the "bore"). Such fibers can be provided in virtually any length desired for the use intended.

The phrase "essentially inorganic materials" denotes a sinterable inorganic material that is substantially free of organic polymeric material.

The term "monolithic" means that the material of the fiber has the same composition throughout its structure with the fiber maintaining its physical configurations due to the presence of sintered particles.

The term "porous" refers to that characteristic of the fiber wall which, although otherwise being continuously relatively dense, has very small, often tortuous, passageways that permit the passage of fluid through the fiber wall other than by diffusion.

SUMMARY OF THE INVENTION

The present invention provides a process to produce essentially inorganic, monolithic hollow fibers (i.e., small tubing). Such hollow fibers comprising metal are particularly preferred. The process for producing such fibers comprises (a) preparing a solution of an organic fiber-forming polymer, containing, in uniformly dispersed form, a sinterable inorganic material; (b) extruding the inorganic material-containing polymer solution through a hollow fiber spinneret; (c) forming a polymeric precursor hollow fiber laden with the inorganic material; (d) treating the polymeric precursor hollow fiber to remove the organic polymer; and (e) sintering the resulting inorganic material in hollow fiber form. The essentially inorganic hollow fiber produced will be similar to the polymeric precursor hollow fiber but on a reduced scale.

DESCRIPTION OF THE PREFERRED EMBODIMENTS

The hollows fibers provided by the present invention will be very useful to workers in numerous fields. These hollow fibers can be prepared relatively economically with widely varying physical configurations while utilizing many types of inorganic materials. Furthermore, it has been found that large amounts of these fibers can be produced with only nominal losses due to flaws and imperfections.

The hollow fibers produced by the process of this invention comprise essentially inorganic materials which are sintered in hollow fiber form. The sinterable inorganic materials comprise a very large group of materials. The preferred sinterable inorganic materials are metals. Nickel, iron and their alloys are particularly useful. The sinterable inorganic materials can be ceramics, such as aluminum oxide, beta-alumina, etc. The sinterable inorganic materials can be cermets or metcers, such as iron metal/aluminum oxide, titanium carbide/nickel, etc.

The hollow fibers produced can have an outer diameter of up to about 2,000 microns. However, production of fibers of larger outer diameters such as 3,000 or 4,000, up to about 6,000 microns, is also contemplated. Generally, the more economically advantageous hollow fibers have an outer diameter of from about 50 to about 700, most preferably from 100 to 550, microns. The fibers often have wall thicknesses of from about 20 to about 300 microns. More particularly preferred are fibers having wall thicknesses of from about 50 to about 200 microns. The fibers generally have a wall thickness to outer diameter ratio of from about 0.5 to about 0.03, particularly preferred of from about 0.5 to about 0.1

An extremely important contribution of the present invention is the ability to provide inorganic hollow fibers with varying sizes and configurations. The size of the fiber can be influenced by the simple expedient of changing spinnerets as is well known in the synthetic fiber field. By varying the extrusion and fiber-forming conditions the fiber wall thickness can also be varied over wide ranges. These characteristics provide those skilled in the art with a unique ability to produce hollow fibers tailored for the application of interest.

These features are provided by the process of this invention which is described more particularly below.

Preparation of Polymer Solution Containing Inorganic Material

A mixture which comprises an inorganic material in uniformly dispersed form in a polymer solution is prepared. The polymer solution comprises a fiber-forming organic polymer dissolved in a suitable solvent. In general the concentration of the organic polymer in the solution is sufficient to form, when the solution contains the inorganic material, the precursor polymeric hollow fibers by dry and/or wet spinning techniques. The polymer concentration can vary over a wide range and depends on the characteristics desired in the resultant hollow fiber. For instance, if hollow fibers having relatively dense walls are desired the concentration can be on the low side. On the other hand, if hollow fibers having less dense walls are desired (all other variables remaining constant) the concentration must be somewhat higher. The maximum concentration is, of course, limited to that where the polymer solution containing the inorganic material is not amenable to extrusion through a spinneret. Correspondingly, the lower limit is where the resultant polymeric precursor hollow fiber does not have sufficient polymer to maintain its structure. In general, the polymer concentrations will be from about 5 to about 35% by weight of the polymer solution. Particularly preferred polymer concentrations are from about 10 to about 30%, more particularly preferred 15% to 30%, by weight of the polymer solution.

The nature of the organic polymer employed in the preparation of the polymeric precursor hollow fiber according to this invention is not critical; for example, polyacrylonitrile, polymers of acrylonitrile with one or more other monomers polymerizable therewith such as vinyl acetate, methyl methacrylate, polyurethanes and polyvinyl chloride may be used. Both addition and condensation polymers which can be cast, extruded or otherwise fabricated to provide hollow fibers by dry or wet spinning techniques are included. Typical polymers suitable for use in the process of the present invention can be substituted or unsubstituted polymers and may be selected from polysulfones; poly(styrenes), including styrene-containing copolymers such as acrylonitrile-styrene copolymers, styrene-butadiene copolymers and styrenevinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly (arylene oxides) such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alphaolefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly (vinyl esters) such as poly(vinyl acetate) and poly (vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyallyls; poly(benzobenzimidazole), polyhydrazides; polyoxadiazoles; polytriazoles; poly(benzimidazole); polycarbodiimides; polyphosphazines, etc., and interpolymers, including block interpolymers containing repeating units from the above such as terpolymers of acrylonitrile-vinyl bromide-sodium salt of parasulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Furthermore, since the organic polymer is to be treated to remove it in subsequent steps of the process, it should be amenable to this treatment. For instance, a more preferred polymer would be one that readily decomposes and/or reacts, but not at an excessively rapid rate, to effect its removal. Still further, such polymers should not form reaction products that will adversely interact with the inorganic materials or interfere with the subsequent steps in the process.

Obviously the cheapest and most readily available polymers are preferred. Polymers and polymers of acrylonitrile with one or more monomers polymerizable therewith or particularly amenable to the process of this invention.

The solvents to be used in the preparation of the polymer solution can be any number of those well known to one skilled in the art. For instance, such solvents as dimethylacetamide, dimethylformamide, dimethyl sulfoxide, etc., are particularly useful with polymers of acrylonitrile with one or more monomers polymerizable therewith. Obviously the solvent selected should be a good solvent for the organic polymer and should be amenable to the dry or wet spinning techniques contemplated in the subsequent steps of the process.

The polymer solution containing an inorganic material can be prepared by dispersing the inorganic material in the solvent followed by the addition and dissolution of the polymer in the solvent. Any other suitable means of preparing the polymer solution containing an inorganic material is acceptable, for instance, by concurrently mixing polymer, inorganic material and solvent or by mixing the polymer and the solvent followed by addition and dispersion of the inorganic material, etc. It is preferred to disperse the inorganic material in the solvent prior to polymer addition.

Ambient or somewhat higher temperatures are usually quite adequate for the preparation of the polymer solution containing an inorganic material. Dependent on polymer, solvent and/or inorganic material utilized higher or lower temperatures may aid the preparation but are not considered critical.

The amount of the inorganic material is inversely related to the same general considerations discussed above concerning the polymer concentration in the polymer solution. The maximum amount is limited to that where the precursor fiber structure can not be maintained because sufficient polymer is not present. The minimum amount is where the inorganic material particles are so widely dispersed that they do not sufficiently fuse or bond during sintering. Normal ratios, by weight, of inorganic material to polymer will range from about 3.5 to about 15. Preferred ratios of inorganic material to polymer are from about 4 to about 12, more preferably from 4.5 to 10.

The inorganic material must be uniformly dispersed as, e.g., small particles, throughout the polymer solution. Sufficient mixing must be carried out to achieve such a uniform dispersion. Although some amount of inorganic material may be dissolved, and this may be helpful in achieving a uniform dispersion, this is not critical to achieving the objectives of the present invention.

The inorganic material incorporated into the polymer solution is a sinterable inorganic material (this phrase includes materials from which a sinterable material can be prepared). Such materials constitute an extraordinarily large group of materials that either are suitable as such or that can be converted to the desired sinterable inorganic material. For instance, if the desired fiber is to comprise a metal, such as nickel or its alloy, either the metal, its oxide or other compounds that can be ultimately converted to the metal can be used.

Although the process of the present invention is particularly useful in producing hollow fibers or metals, such as by the reduction of metal oxides to metal and sintering of the metal, it may be utilized to produce hollow fibers of any inorganic materials that are sinterable or that can be converted to a sinterable material. Such inorganic materials are discussed above. For purposes of illustration, the following detailed description will be limited to metal compounds which are reducible to metals and which are sinterable.

Since the reduction temperatures must, of course, be below the melting and vaporization point of the compounds being reduced and of the elemental metal formed, the metal compounds which vaporize or sublime excessively at temperatures below that at which they will react with hydrogen or carbon, the metal component of which has such a low temperature of vaporization of sublimation (e.g., K, Na, Li, etc.), may not be satisfactorily used in accordance with the present process without special consideration. Although the use of hydrogen to provide the environment for reducing the metal compound particles to elemental metal is a preferred embodiment of the present invention, other reducing materials may be employed. For example, the metal compounds and particularly nickel and iron oxides can be reduced by partially or wholly substituting carbon monoxide for the hydrogen reducing environment. Obviously the constituents of the polymer and traces of solvent will also contribute to such a reducing environment.

Additionally the metal compound itself is limited to those materials wherein the reaction products, other than the elemental metal, will leave the reaction zone prior to or during sintering of the hollow fiber.

The most significant metal compounds are, of course, the oxides since these compounds are the most plentiful; and, in fact, are the state in which metals are most commonly found as by-products of manufacturing and in natural ore concentrates. Other compounds which may be utilized include metal halides, hydroxides, carbonates, oxalates, acetates, etc.

Particle size is an important factor for producing the desired hollow fibers regardless of the inorganic material utilized. Small particles utilized for dispersion in the polymer solution usually range in size from less than 15 microns, preferably 10 microns, most preferably 5 microns or less. Generally such particles will range in size distribution from one end of the scale to the other. Obviously the smaller particle sizes, i.e., less than 10 microns, are preferred in order to obtain a uniform dispersion. To obtain metal fibers of desired characteristics it may be necessary to use very small particles, i.e., 5 microns or less. This may require particle size comminution and/or classification to achieve desired sizes.

A generally smaller diameter particle would be expected to intensify "outgassing" cracking and surface problems observed with compaction procedures since the smaller particles are closer together leaving less room for the evolved reaction gases to escape. However, it has been found that where the smaller diameter particles are utilized a more flaw-free hollow fiber can be produced.

A still further difficulty in using very fine metal particles relates to the tendency of many metals to oxidize when exposed to air in small particle form. For example, fine iron particles (40 microns or less) tend to react exothermically when exposed to air to form iron oxide particles. Thus, it is difficult to handle such materials while the oxide particles can be freely shipped and easily handled without providing air tight protective envelopes or making special provisions to avoid spontaneous reactions. The process of this invention is particularly amenable to use of oxides since oxide particles are often by-products of metal treating, and, consequently, are readily available at low prices. For example, iron oxide particles obtained as a by-product from hydrochloric acid pickling is readily available. Other sources of iron oxide particles include dust from basic oxygen converters, rust, mill scale, and high-grade iron ore. Nickel oxide is available at nominal prices.

Metal compound particles of any general shape (i.e., spherical, oblong, needles, or rods, etc.) may be employed in accordance with the present invention. Metal oxide particles obtained by the process of spray drying a dissolved metal compound can provide superior hollow fibers.

Accurate particle size determinations of fine-grained particles are difficult to obtain, particularly where the size includes particles less than 10 microns in diameter (or smallest dimension). Such determinations are most difficult where the particles are of non-uniform shape. For example, many of the particles are likely to be of a relatively elongated configuration so that it is difficult to determine the smallest dimension of the particle. Elongated particles will not pass through a screen having a mesh that is designed to accommodate a relatively symmetrically shaped particle of equivalent mass. As a result particle size and particle size distribution measurements vary to a considerable degree for a given material between the known methods and procedures for making such determinations.

Relatively accurate fine-grained particle size determinations may be made through the use of Coulter counter procedure. In this procedure the particles are suspended in an electrically conductive liquid and are caused to flow through a small orifice. A current is caused to flow through the orifice by means of two immersed electrodes, one on each side of the orifice. As the particles flow through the orifice, the change of electrical resistance between the electrodes is measured to determine particle size. Thus, the measure primarily is interpreted on particle mass and is not affected by shape.

A particularly desirable feature of the process of the present invention when using metal compounds relates to the "active" state of the metal fiber reduction of the metal compound particles and prior to sintering. Metal particles tend to acquire a thin oxide coating or film and in fact nearly all metal powders of fine particle size must acquire or be provided with such a film to prevent rapid oxidation or defeat the pyrophoric nature of such materials. Such a film renders the particles "passive" so that they may be handled in ordinary atmosphere. However, such a film is difficult to reduce and retards sintering. When metal compound particles are reduced in accordance with the process of the present invention and are sintered subsequent to reduction without being exposed to an oxidizing environment hollow fibers having excellent properties may be obtained due to the "active" nature of the reduced particles. This feature further enhances the value of this invention.

Metal alloys can be provided as the inorganic material of the fiber of this invention by the simple expedient of mixing particles of metal compounds, e.g., metal oxides, and dispersing this mixture in the polymer solution. Such alloys can provide useful strength and other characteristics. Exemplary of such alloys are those formed using nickel and iron oxides.

Another acceptable procedure for making metal hollow fibers by the practice of the process of the present invention is to incorporate metal particles with the particulate metal compounds. Preferably the metal particles will be blended with the metal compounds prior to dispersion in the polymer solution. Reducing and sintering may be accomplished at the usual temperatures and in the presence of the usual atmospheres (in accordance with the process of the present invention). The sintering temperature may be high enough to effect diffusion of the elemental metal into the reduced base metal to effect alloying. Consequently, it may be necessary or desirable to employ a somewhat higher sintering temperature where the elemental metal has a low diffusion rate. If the sintering temperature of the elemental metal (or temperature at which diffusion of the elemental metal into the base metal will occur) is higher than the melting point of the base metal then alloying may not be accomplished. However, in the latter eventuality the elemental metal or its oxide may dispersion strengthen the base metal.

An additional use of metal particles is to reduce shrinkage of the sintered product. In any sintering process, the metal article shrinks in its outer dimensions due to the elimination of the void spaces between the particles when the particles fuse to form a solid mass. When the inorganic material comprises metal compounds such as metal oxides that are first reduced and then sintered in accordance with the method of the present invention such shrinkage is accentuated due to the fact that the reduced particles are smaller than the metal compound particles and thus provide greater void spaces between particles. Such shrinkage can be reduced or minimized by adding elemental metal particles to the metal compound particles for incorporation in the polymer solutions. For example, it may be desirable to add up to 50 percent, by weight, nickel powder to nickel oxide powder to reduce shrinkage of the resultant hollow fiber. The particle size of the elemental metal particles will preferably be very small since such dispersed particles will diffuse into a matrix metal quickly and evenly.

Further, by including with the metal compound a proportion of dispersed, non-reducible (or diffusible) materials of controlled particle size, it is possible to effect a dispersion strengthened sintered product. The particles may consist of elemental metals that sinter at a higher temperature than the sintered product.

As mentioned above, the sinterable inorganic material can be a material that comprises the fiber material without chemical modification or a material that is converted to a desired form by chemical modification. As extensively discussed above, metal compounds particularly metal oxides, are illustrative of the latter materials. If metal fibers are desired these oxides require reduction to the elemental metal prior to or during sintering. Other materials that are amenable to the process of the present invention are those that may require oxidation or both oxidation and reduction to form the material comprising the resultant hollow fiber. Although these procedures will not be discussed in the detail provided for metal compounds, these materials, such as aluminum, are also useful with the process of this invention. Other inorganic materials which can be provided by simultaneous oxidation and reduction are also useful in the process of this invention. Illustrative of these materials is the simultaneous oxidation and reduction of aluminum or titanium and iron oxide or nickel oxide. The following materials illustrative of those materials which can comprise the final fibers without chemical modification (i.e., without reduction and/or oxidation) are metals, ceramics such as alumina, beta-alumina, glass, mullite, silica, etc.

The polymer solution containing an inorganic material can also contain other additives to assist in this and subsequent steps in the process, particularly for instance, in the extrusion and fiber-forming steps. Surfactants such as sorbitan monopalmitate, etc., are useful to wet the inorganic material by the solvent of the polymer solution. Plasticizers such as N,N-dimethyl lauramide, etc., are useful to provide polymeric fiber flexibility.

Extrusion of Polymer Solution Containing Inorganic Material

In making hollow fibers by the process of the present invention, a wide variety of extrusion conditions may be employed. As previously discussed, the weight percent polymer in the solution may vary widely but is sufficient to provide a hollow fiber under the extrusion and fiber-forming conditions. If the inorganic material, polymer and/or solvent contain contaminants, such as water, particulates, etc., the amount of contaminants should be sufficiently low to permit extrusion and/or not interfere with or adversely affect subsequent steps in the process or the resultant fiber. If necessary, contaminants can be removed from the polymer solution by filtration procedures. Obviously filtration must be appropriate to remove contaminant particles while passing the particles of inorganic material. Such filtration may also remove particles of inorganic material which are above the desired particle size. The presence of excessive amounts of gas in the polymer solution containing inorganic material may result in the formation of large voids and undesirable formation of porosity in the precursor polymeric hollow fiber. Accordingly, degassing procedures are also appropriate. Such degassing and/or filtration procedures can be carried out immediately after or during preparation of the polymer solution containing an inorganic material or can be carried out immediately prior to or during the extrusion step.

The size of the hollow fiber spinnerets will vary with the desired inside and outside diameters of the resultant polymeric precursor hollow fiber. The spinnerets may also vary in shape, i.e., hexagonal, oblong, star, etc. The spinnerets are generally circular in shape and may have outer diameters of, for instance, about 75 to about 6000 microns with center pin outer diameters of about 50 to about 5900 microns with an injection capillary within the center pin. The diameter of injection capillary may vary within the limits established by the pin. The polymer solution containing the inorganic material is frequently maintained under a substantially inert atmosphere to prevent contamination and/or coagulation of the polymer prior to extrusion and to avoid undue fire risks with volatile and flammable solvents. A convenient atmosphere is dry nitrogen.

The temperature preparatory for extrusion of the polymer solution containing inorganic material can vary over a wide temperature range. In general the temperature is sufficient to prevent undesirable coagulation or precipitation prior to extrusion. The temperature generally can range from about 15° C. to about 100° C. preferably from about 20° C. to about 75° C.

The pressure to accomplish the extrusion is normally those within the ranges understood by those skilled in the fiber spinning arts. The pressure depends on, for instance, the desired extrusion rates, the orifice size and the viscosity of the polymer solution containing the inorganic material. Of particular note is the fact that relatively low pressures can be utilized with the process of the present invention. This contrasts with compaction procedures which often require hundreds of atmospheres of pressure to provide compacted and sintered articles. The pressure useful with the present invention normally range from about 1 atmosphere up to about 5 atmospheres or higher.

Obviously the fibers can be extruded through a plurality of spinnerets. This will enable the concurrent formation of multiple fibers while, for instance, using the same coagulating bath.

Formation of the Polymeric Precursor Hollow Fiber

In general, fiber-forming spinning techniques are known to those skilled in the synthetic fiber-forming industries. These skills can be advantageously applied to the fiber-forming step of the process of this invention. The fiber-forming step may be conducted using wet or dry spinning techniques, i.e., the spinneret may be in or removed from the coagulating bath. The wet technique is often preferred and may be used for the sake of convenience. That is, the fiber coagulation can be effected by bringing the fiber which is being formed by extrusion into contact with a coagulating bath. It suffices to pass the fiber which is being formed into the coagulating bath. A fluid which coagulates the polymer of polymer solution is usually injected into the bore of the fiber being formed. The fluid may comprise, e.g., air, isopropanol, water, or the like.

Any essentially non-solvent for the polymer can be employed as the coagulating agent in the coagulating bath. The coagulating agent may be miscible with the solvent. The nature of the coagulating agent selected depends on the solvents used for the organic polymer and the choice depends on criteria known in the field of fiber spinning. It is important to use mild coagulating agents for both the bore injection fluid and in the coagulating bath to obtain uniform density fiber walls. By a "mild coagulating agent" is meant a medium in which the organic polymer will precipitate slowly so that coagulation does not occur rapidly. Conveniently, water is employed as a coagulating agent at low concentrations in the coagulating bath. Other coagulating agents are: ethylene glycol, polyethylene glycol, propylene glycol, methanol, ethanol and propanol, etc. Ethylene glycol is a particularly preferred coagulating agent. The residence time for the extruded fiber in the coagulating bath is at least sufficient to ensure reasonable solidification of the fiber. The fiber wall is formed due to interaction with the coagulating agents and/or cooling. (Cooling may also be achieved by bringing the extruded polymer solution containing inorganic material into contact with a gas at a temperature below the gelling temperature of the polymer solution. Where gelling is accomplished in this manner, the cooling gas can be subjected to a relatively rapid translatory movement which can be oriented in a direction parallel to that of the hollow fiber. This gas may additionally be charged with water vapor or the vapor of some other non-solvent). Where gelling is also accomplished in the coagulating bath the bath may, in addition to its gelling effect, also impart a coagulating effect.

The temperature of the coagulating bath may also vary widely, e.g., from $-15°$ to $95°$ C. or more, and is most often about $1°$ to $35°$ C., say, about $2°$ to $25°$ C. The temperature of the fluid injected into the bore is generally within the same ranges.

After coagulating the fiber it may be washed to remove solvent by, for instance, washing with the coagulating bath solution or with other non-solvents that are miscible with the solvent of the polymer solution. Washing may cause further coagulation. The precursor hollow fiber may also be stored in a water or other liquid bath.

The extrusion and fiber-forming conditions are preferably such that the fiber is not unduly stretched. Although not necessary, stretching can be used say, about 1 to about 5 fold. Frequently, extrusion and fiber-forming speeds are within the range of about 5 to 100 meters per minute although higher speeds can be employed providing the fiber is not unduly stretched and sufficient residence time is provided in the coagulating bath. Stretching generally strengthens the polymeric precursor hollow fiber. Stretching also allows increased linear productivity and smaller fiber diameters with a given spinneret.

An annealing procedure may also be carried out to toughen the polymeric precursor hollow fiber. Both the stretching and annealing procedures can be conducted by, for instance, passing the fiber through boiling water.

The precursor hollow fibers of polymer laden with an inorganic material can be subjected to the subsequent steps in the process or can be taken up and stored in precursor form on, for instance, bobbins. The precursor fibers are flexible and have reasonable degree of strength and can therefore be handled without undue concern for damage.

After obtaining the precursor fiber by the process of the invention drying may be carried out in a known manner. The fibers are generally, but not necessarily, dried prior to treatment to remove the organic polymer. The drying may be conducted at about $0°$ to $90°$ C., conveniently about room temperature, e.g., about $15°$ to $35°$ C., and at about 5 to 95, conveniently about 40 to 60, percent relative humidity.

The precursor hollow fiber comprises the polymer in minor amount acting as the carrier for the inorganic material which is uniformly dispersed throughout the polymer. Generally, the polymer is present in the precursor hollow fiber in concentrations substantially less than 50% and often as low as 25%, 15%, or 5% by weight. The major component in the precursor fiber being, of course, the inorganic material. Other materials may be present in the precursor fiber but generally only in small amounts.

Treatment to Remove Organic Polymer

After formation of the polymeric precursor hollow fibers laden with inorganic material the fiber can be preferably dried or stored and dried as discussed above, or transferred directly to a treatment to remove the organic polymer from the fiber. This can be accomplished by heating to decompose and/or react the organic polymer. This may be accomplished in an inert or reducing atmosphere to aid in reduction of the inorganic material, although this is not always necessary.

As mentioned above, the reaction products formed from the organic polymer may serve to enhance the other steps of the process. For instance, the hydrogen and carbon present in the polymer serve as an excellent source of a reducing environment. This environment helps to reduce metal compounds, e.g., oxides, to the elemental metal.

The fiber containing inorganic material may, optionally, be subjected to reduction and/or oxidation. (It is, of course, recognized that neither reduction or oxidation may be necessary if the inorganic material dispersed into the polymer solution is in the chemical form desired for sintering.) Preferably an appropriate atmosphere will be provided just prior to the fiber being subjected to the reduction and/or oxidation temperature. For instance, with reduction, this may be accomplished by continuously passing the polymeric precursor hollow fiber laden with a reducible inorganic material through a commercially available oven. An atmosphere comprising, for instance, hydrogen may be caused to flow countercurrently and in contact therewith. As the fiber first contacts the heat of the oven, the remaining volatile components will outgas. As the temperature approaches reducing temperatures, the reducible inorganic material, for instance, metal compounds are converted to elemental metal and the reaction products outgas.

For the purposes of the present invention and this specification, it will be understood that the temperature range at which polymer removal and reduction and/or oxidation will occur and the sintering temperatures may overlap to some extent. In other words, some sintering may occur at the temperatures at which polymer removal and reduction and/or oxidation is carried out, although it is preferable that the temperature be such that reduction takes place immediately preceding sintering. The preferred temperatures at which reducible inorganic materials, i.e., metal compounds will reduce are well-known to those skilled in the art or their determination is well within the skill of those of ordinary competency.

The preferred reducing environment may be provided by any atmosphere which provides a source of hydrogen. For example, such an atmosphere may comprise pure hydrogen, cracked hydrocarbons, dissociated ammonia, combinations of each, combinations of one or more of such gases and other gases or vapors which will not materially interfere with the reduction reaction. The reaction products from the decomposition and/or oxidizing of the polymer are valuable aids in providing the reducing atmosphere.

Solid reducing materials, carbon for example, may be employed in combination with the hydrogen yielding gas only where the reactants (e.g., CO and $CO_2$) appropriately "outgas" and will not leave residual elements in the sintered fiber that will interfere with the desired fiber properties. For example, carbon may be a desired addition to the oxide powder as set forth above where the ultimate product is a steel composition and the residual carbon is a necessary element for the finished fiber.

Oxidation of the inorganic material can be conducted at the appropriate temperatures under suitable pressures and atmospheres. Air is the preferred atmosphere. The oxidation temperatures are generally well-known or readily ascertainable. Simultaneous oxidation and reduction can occur, say, for instance, in the formation of cermets. The resulting fiber comprising a sinterable inorganic material may then be conducted directly into a sintering zone.

Sintering to Form to Inorganic Fiber

The term "sintering" is meant to include an agglomeration by fusion and bonding of the sinterable inorganic material to at least that point at which the particulate material forms a monolithic structure. Sintering should provide a fiber having substantial strength as compared to a fiber which has undergone the previous steps and has not been sintered. The sintering must be conducted under conditions that assure that the valence state desired is achieved or maintained under sufficient temperatures and times to allow the fusion and bonding to occur.

In the production of the hollow fibers of this invention there are little or no limitations on the heating rate for sintering. For instance, the sintering of a nickel-iron alloy fiber can be at from about 950° C. to about 1200° C. for from 15 to 5 minutes, respectively. A nickel-iron alloy fiber produced under these conditions is excellent. In general, similar to the reduction and oxidation temperatures, the preferred sintering temperatures of the inorganic materials are well-known or readily ascertainable.

During the organic polymer removal, optional reduction and/or oxidation of the inorganic material and sintering steps, suitable conditions must be maintained to avoid damage or destruction to the fiber wall structure and integrity. A shrinkage ratio (final fiber to precursor fiber) of from about 0.2 to about 0.9 can be expected, usually 0.3 to 0.6. That is, the precursor hollow fiber is often transformed to the final hollow fiber with substantial size reduction. This is expected during these process steps. For instance, the fiber is substantially reduced in length and the fiber outer diameter and wall, although remaining in relative relationships, are also reduced in size. During these steps means must be provided to handle the fiber as it shrinks. Particularly critical is the point immediately prior to sintering where the fiber is fairly fragile. At this point, particular care must be taken to provide means to afford such shrinkage without damage to the fiber. For instance, if the fiber is allowed to adhere to a conveying surface at this point it may break as it shrinks. One method of handling the fiber at this point is to feed a precursor fiber, which may be pretreated, e.g., with water, to provide better handling characteristics, into the furnace by means of a conveyor belt which is fabricated of material which does not adhere to the fiber under the operating conditions of the furnace. This conveyor belt can be transporting the fiber at the speed of the final fiber as it exits the furnace. The precursor fiber feed speed is faster than the final fiber speed. The precursor feed speed can be adjusted to account for the shrinkage that occurs.

A particularly important feature of the process of this invention is the ability to produce fibers having relative strong and dense walls. This feature is surprising since the polymer of the polymeric precursor fiber is the continuous phase which is removed as discussed above. It has been found that, although the polymer is removed from the fiber wall of a precursor fiber, the final fiber, after sintering, is usually quite strong and dense. Although it might be expected that shrinkage and reduction of interstices between particles of inorganic materials might occur when the inorganic material undergoes reduction, oxidation and/or sintering, the formation of a fiber wall that is strong and dense, i.e., inhibits passage of fluids, is both desirable and unexpected. This phenomena appears to occur throughout the fiber wall where ever polymer is removed. It has been observed particularly when using metal compounds, e.g., oxides, to convert to elemental metal.

The process of this invention can also produce hollow fibers having a porous wall. This can be achieved by, for instance, treating the fiber wall with a fluid that has some interaction with the material of the wall to produce a porous wall. For instance, a polymeric precursor fiber containing nickel oxide can result in a uniformly porous wall surface by introducing ammonia gas in the atmosphere in the furnace.

An alternate means to obtain a porous fiber wall is to introduce a relatively small amount of fine particulate material which does not participate in the sintering or participates in the sintering to a lesser degree. Incorporation of such fine particulate materials in the polymer solution containing an inorganic material during its preparation can result in a porous fiber wall in the final inorganic fiber.

The hollow fiber resulting from the process is strong compared to precursor fiber and fibers from the intervening steps. The final fibers may be flexible enough to be stored on bobbins.

It is claimed:

1. A process comprising
   (a) preparing a solution of an organic fiber-forming polymer, containing, in a uniformly dispersed form, a sinterable inorganic material;
   (b) extruding the inorganic material-containing polymer solution through a hollow fiber spinneret;
   (c) forming a polymeric precursor hollow fiber, laden with the inorganic material;
   (d) treating the polymeric precursor hollow fiber to remove the organic polymer; and
   (e) sintering the inorganic material; provided that steps (d) and (e) are conducted under conditions that maintain a hollow fiber form.

2. The process according to claim 1 wherein the inorganic material dispersed in the polymer solution comprises a metal compound which is reduced prior to or during sintering.

3. The process according to claim 2 wherein the inorganic material dispersed in the polymer solution comprises a metal oxide.

4. The process according to claim 3 wherein the metal oxide dispersed in the polymer solution comprises nickel oxide or nickel oxide and an oxide of a metal that forms a nickel alloy.

5. The process according to claim 4 wherein the metal oxide that forms a nickel alloy is iron oxide.

6. A process according to claims 1, 2, 3, 4 or 5 wherein the inorganic material-containing polymer solution is extruded directly into a coagulating bath.

7. A process according to claim 6 wherein a coagulating agent is injected into the bore of the fiber as it is extruded.

8. A process according to claim 6 wherein the coagulating agent comprises water.

9. A process according to claims 1, 2, 3, 4 or 5 wherein the inorganic material-containing polymer solution passes through a gas before contacting the coagulating bath.

10. A process according to claim 9 wherein a coagulating agent is injected into the bore of the fiber as it is extruded.

11. A process according to claim 9 wherein the coagulating agent comprises water.

12. A process according to claim 6 wherein the coagulating agent comprises ethylene glycol.

13. A process according to claim 9 wherein the coagulating agent comprises ethylene glycol.

* * * * *